US006760773B1

(12) United States Patent
Kuo

(10) Patent No.: US 6,760,773 B1
(45) Date of Patent: Jul. 6, 2004

(54) INFRARED TRANSMISSION CODES FOR WIRELESS KEYBOARD AND PC REMOTE CONTROLLER

(75) Inventor: Chunn Cherh Kuo, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 605 days.

(21) Appl. No.: 09/628,897

(22) Filed: Jul. 31, 2000

(51) Int. Cl.[7] ................................................ G06F 15/16

(52) U.S. Cl. ....................... 709/232; 709/217; 709/219; 709/236; 341/176; 341/178

(58) Field of Search ................................ 709/217, 219, 709/232, 236; 345/158, 168; 341/176, 178

(56) References Cited

U.S. PATENT DOCUMENTS 5,903,259 A * 5/1999 Brusky et al. .............. 345/168
5,990,868 A * 11/1999 Frederick ..................... 345/158
6,008,921 A * 12/1999 Brusky et al. .............. 398/106
6,346,874 B1 * 2/2002 Maeshima .................. 340/5.2
6,504,526 B1 * 1/2003 Mauritz ....................... 345/158
6,516,035 B1 * 2/2003 Wang et al. ................ 375/253
6,522,283 B1 * 2/2003 Shiga et al. ................ 341/176
6,538,595 B1 * 3/2003 Tucker et al. ............... 341/178
6,542,149 B1 * 4/2003 Chung ........................ 345/158
6,567,016 B1 * 5/2003 Rajamani et al. ............. 341/24

FOREIGN PATENT DOCUMENTS

JP 6175764 A 6/1994
JP 6-222866 8/1994
JP 6303151 10/1994
JP 9-230983 9/1997
JP 11-196070 7/1999
JP 112634 4/2000

* cited by examiner

*Primary Examiner*—Nabil El-Hady
(74) *Attorney, Agent, or Firm*—Rosenberg, Klein & Lee

(57) ABSTRACT

The present invention relates to an infrared transmission protocol and more particularly to an infrared transmission protocol for wireless keyboard and PC remote controller. The transmission codes are grouped into four parts—key codes for keyboard, button codes for remote controller, mouse codes for keyboard, and mouse codes for remote controller. Key codes for keyboard are used to identify the MAKE and BREAK of keys on wireless keyboard. Button codes for remote controller are used to identify the MAKE and BREAK of buttons on PC remote controller. Mouse codes for keyboard and remote controller are defined separately. They are used to identify action of pointing devices on wireless keyboard and PC remote controller. Transmission codes are encoded into the RS232 format and transmitted through infrared wave at the baud rate of 1200. Each key packet for keyboard consists of two data-units. Each mouse packet for keyboard and each button and mouse packet for PC remote controller consist of three data-units. Each data-unit contains total ten bits of information—one start bit, seven data bits, one parity nit and one stop bit.

19 Claims, 1 Drawing Sheet

INFRARED TRANSMISSION CODES FOR WIRELESS KEYBOARD AND PC REMOTE CONTROLLER

FIELD OF THE INVENTION

Figure 1:
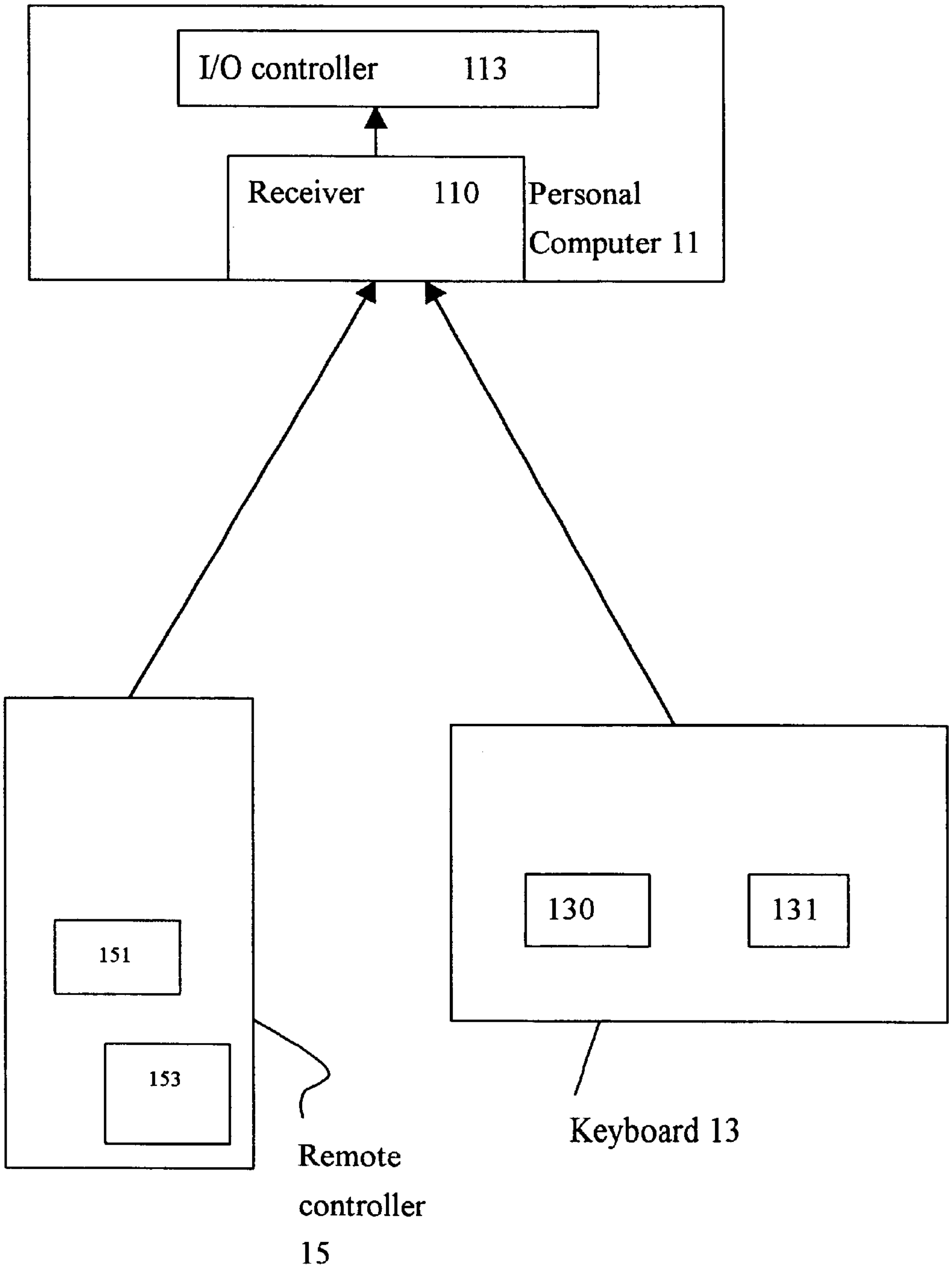

The present invention relates to an infrared signal transmission protocol and more particularly to an infrared signal transmission protocol for wireless keyboard and PC remote controller. The protocol identifies the codes transmitted corresponding to various statuses of either keys, or button or pointing device respectively on the wireless keyboard and PC remote controller.

BACKGROUND OF THE INVENTION

Due to the need for wireless communication or control from a wireless keyboard and personal computer (PC) remote controller respectively, wireless keyboard or PC remote controller has been introduced into marketplace recently. As shown in FIG. 1, on the personal computer 11, a conventional infrared signal receiver 110, an I/O controller 113 having a standard RS-232 port are provided. For instance, the conventional infrared signal receiver 110 may be the type that decodes infrared signal of 940 nm with a 38 KHz carrier. In a well known manner, the output of the receiver 110 is received by the I/O controller 113 through the standard RS-232 port. The input device to the personal computer 11 may include the keyboard 13 and the PC remote controller 15. Either the keyboard 13 or the PC remote controller 15 is selectively connected to the personal computer 11 wirelessly. In typical, the keyboard 13 has a pointing device 130, i.e. mouse, and a plurality of keys thereon. In typical, the PC remote controller 15 has a plurality of buttons (functions) 151, i.e. CD, and a pointing device 153 thereon.

SUMMARY OF THE INVENTION

Under the configuration shown in FIG. 1, the present invention provides an infrared signal transmission protocol for the wireless keyboard and PC remote controller such that interference between the other audio/video electronic appliances and the wireless keyboard and PC remote controller are prevented. The transmission protocol provided by present invention not only allows to differentiate the transmission signals generated by the wireless keyboard and PC remote controller from those generated by controllers for other well known electronic appliances, but also encodes into the well known RS-232 format before transmitting to the receiver.

The communication protocol of the keyboard includes a MAKE code and a BREAK code.

The MAKE code is generated when one key is depressed and the BREAK code is generated when one key is released from a depressed condition.

The MAKE code includes a first data and a second data following the first data. The first data is formed by performing exclusive OR (XOR) operation over a parameter and a first ID code.

In a preferred embodiment, the parameter is obtained by summing a key number assigned to the key and a first predetermined constant.

BRIEF DESCRIPTION OF THE APPENDED DRAWINGS

FIG. 1 shows the system to which the invention is applicable.

DETAILED DESCRIPTION OF THE PRESENT INVENTION

The present invention provides an infrared transmission protocol of an input device wirelessly communicating with a personal computer. The input device includes a keyboard and a personal computer (PC) remote controller. The transmission codes are grouped into four parts—key codes for keyboard, button codes for remote controller, mouse codes for keyboard, and mouse codes for remote controller.

The key codes for keyboard includes six different types—MAKE, BREAK, END, REPEAT, EXTENT, and ERROR, and each type has its corresponding function. For example, a MAKE code is generated and sent by a microcontroller in the keyboard when a key is pressed. A BREAK code is generated and sent when a key is released from a depressed condition. An END code is sent about 0.1 second after keys are released from depressed status. A REPEAT code is generated and sent when the last key pressed is staying pressed for over 0.25 seconds. An EXTENT code is the leading code for extended keys on the keyboard. An ERROR code is sent when a ghost combination of depressed keys is detected.

In particular, the MAKE code corresponding to a key provided by the present invention includes a first data and a second data following the first data. The first data is formed by performing exclusive OR (XOR) operation over a parameter and a first ID code.

In an embodiment, the parameter is obtained by summing a key number assigned to the key and a first predetermined constant. In an embodiment, the first predetermined constant is 128 in decimal. In an embodiment, the first ID code is 53 in Hexadecimal.

In an embodiment, the second data is formed by performing XOR operation over the parameter and a second ID code. In an embodiment, the second ID code is AB in Hexadecimal.

Furthermore, the MAKE code is encoded into an RS232 format before transmitting to the personal computer. As this is implemented and an RS-232 port is provided on the personal computer, the personal computer may receive the code transmitted through the provided RS-232 port obviating the need for an extra microcontroller on the personal computer.

In particular, the BREAK code corresponding to a key provided by the present invention includes a first data and a second data following the first data. The first data is formed by performing XOR operation over the key number assigned to the key and the first ID code. The second data is formed by performing XOR operation over the key number and the second ID code.

In particular, as an extended key is depressed, an EXTENT code representative of a leading code for the extended key is generated. The EXTENT code includes a first data and a second data following the first data. The first data is formed by performing XOR operation over a second predetermined constant and the first ID code, the second data is formed by performing XOR operation over the second predetermined constant and the second ID code. In an embodiment, the second predetermined constant is 5E in Hexadecimal.

In particular, the communication protocol of the invention further includes an ERROR code corresponding to a ghost combination of depressed keys. The ERROR code includes a first data and a second data following the first data. The first data is formed by performing XOR operation over a third predetermined constant and the first ID code, the second data is formed by performing XOR operation over the third predetermined constant and the second ID code. In an embodiment, the third predetermined constant is 8E in Hexadecimal.

Furthermore, the END code includes a first data and a following second data. The first data is generated by performing XOR operation over the 0EH and the first ID code. The second data is generated by performing XOR operation over the 0EH and the second ID code.

Furthermore, the REPEAT code includes a first data and a following second data. The first data is generated by performing XOR operation over the 00H and the first ID code. The second data is generated by performing XOR operation over the 00H and the second ID code.

As the above mentioned embodiments are implemented, the following table discloses the summary of the preferred embodiments.

| | Data 1 | Data 2 |
|---|---|---|
| MAKE | Key Number + 128) XOR (ID Code 1) | (Key Number + 128) XOR (ID Code 2) |
| BREAK | (Key Number) XOR (ID Code 1) | (Key Number) XOR (ID Code 2) |
| END | 0EH XOR (ID Code 1) | 0EH XOR (ID Code 2) |
| REPEAT | 00H XOR (ID Code 1) | 00H XOR (ID Code 2) |
| EXTENT | 5EH XOR (ID Code 1) | 5EH XOR (ID Code 2) |
| ERROR | 8EH XOR (ID Code 1) | 8EH XOR (ID Code 2) |

Following is an example depicting the codes generated when the key "K" is pressed and released. As an illustration purpose, hereinafter, the key number assigned to "K" is 00100110. When pressing "K", Data 1 generated for the MAKE code is 11110101 (F5H), and Data 2 generated is 00001101 (6DH). When "K" is released, the BREAK code generated. Data 1 of the BREAK code is 01110101(75H) and Data 2 is 10001100 (8D). And about 0.1 seconds after "K" is released, the END code is generated, and Data 1 of the END code is 01011101 (5D) and Data 2 of the END code is 10100101 (A5).

The keyboard may further includes a pointing device, i.e. mouse. As the pointing device is moved, a pointing packet is generated. Mouse code packet for wireless keyboard consists of three data units. That is, one identification (ID) code, a first code indicative of increment in X-direction following the identification code, and a second code indicative of increment in Y-direction following the first code. In an embodiment, the identification code selected is 3F in Hexadecimal. The transmission sequence of mouse codes for wireless keyboard is indicated as follows.

| | Bit Number | | | | | | | |
|---|---|---|---|---|---|---|---|---|
| | 7 | 6 | 5 | 4 | 3 | 2 | 1 | 0 |
| $1^{st}$ Byte (ID) | 0 | 0 | 1 | 1 | 1 | 1 | 1 | 1 |
| $2^{nd}$ Byte | X7 | X6 | X5 | X4 | X3 | X2 | X1 | X0 |
| $3^{rd}$ Byte | Y7 | Y6 | Y5 | Y4 | Y3 | Y2 | Y1 | Y0 |

X6 equal to 1 is prohibited, and Y6 equal to 1 is prohibited.

As an illustrative purpose, when there is a move count (0,1) of pointing device reported from the wireless keyboard, the codes generated reads as follows: 00111111, 00000000, and 00000001.

Button code packets for PC remote controller also consist of three data units. Three types of sequence for buttons are provided. They are MAKE, REPEAT, and BREAK.

The MAKE sequence denotes that a button is depressed. That is, as the button on the PC remote controller is depressed, a packet is generated. The packet includes a make-code, a button-code assigned to button following the make-code, and a check-code following the button-code. In an embodiment, the check code is the inverse of the button-code. The $6^{th}$ bit preceding the make-code is set to be 0. The $6^{th}$ bit preceding the button-code is set to be 1. The $6^{th}$ bit preceding the check-code is set to be 1.

The REPEAT sequence denotes that a button is depressed longer than about 100 ms. The REPEAT sequence transmits repeatedly in a period of about 100 ms. That is, as the button on the PC remote controller is depressed longer than about 100 ms, a packet is generated. The packet includes a repeat-code, a button-code assigned to button following the repeat-code, and a check-code following the button-code. In an embodiment, the check code is the inverse of the button-code. The $6^{th}$ bit preceding the repeat-code is set to be 0. The $6^{th}$ bit preceding the button-code is set to be 1. The $6^{th}$ bit preceding the check-code is set to be 1.

The BREAK sequence denotes the end of REPEAT sequence and also the releasing of the button. The packet corresponding to the BREAK sequence includes a break-code, a button-code assigned to button following the break-code, and a check-code following the button-code. In an embodiment, the check code is the inverse of the button-code. The $6^{th}$ bit preceding the break-code is set to be 0. The $6^{th}$ bit preceding the button-code is set to be 1. The $6^{th}$ bit preceding the check-code is set to be 1.

The mouse packets for PC remote controller consist of three data units. The first data-unit contains five identification bits and "Left" and "Right" button status. The next data-unit contains five data bits for horizontal movement. The last data-unit contains five data bits for vertical movement. The transmission sequence of mouse codes for PC remote controller is indicated as follows. When the X5 bit is set, mouse is moving in the negative X direction. When the Y5 bit is set, mouse is moving in the negative Y direction.

| | Bit Number | | | | | | | |
|---|---|---|---|---|---|---|---|---|
| | 7 | 6 | 5 | 4 | 3 | 2 | 1 | 0 |
| 1st Byte (ID) | P0# | 1 | 1 | 1 | 1 | 1 | L | R |
| 2nd Byte | P1# | 0 | X5 | X4 | X3 | X2 | X1 | X0 |
| 3rd Byte | P2# | 0 | Y5* | Y4* | Y3* | Y2* | Y1* | Y0* |

# denotes odd parity check bit and * denotes 2's complement

From above recitations, it is observed that the combination of $6^{th}$ bits of the mouse codes for wireless keyboard is (0, X6, Y6), where X6 is a number other than 1, and Y6 is a number other than 1. Also, the combination of $6^{th}$ bits of the button code for PC remote controller is always (0, 1, 1), and the combination of $6^{th}$ bits of the mouse code for PC remote controller is always (1, 0, 0). The difference between them allows the receiver on the personal computer to easily distinguish one from one another.

While the above preferred embodiment and application of the invention has been described for illustrative purpose, it is apparent to those skilled in the art that the objects and features of the present invention are only limited as set forth in claims attached hereto.

What is claimed is:

1. A communication protocol of an input device wirelessly communicating with a personal computer, the input device including a keyboard having at least one key, comprising:

a MAKE code generated when said one key is depressed;

a BREAK code generated when said one key is released from a depressed condition; wherein the MAKE code comprises a first data and a second data different from the first data and following the first data, and the first data is formed by performing XOR operation over a parameter and a first ID code.

2. The protocol of claim 1, wherein the parameter is obtained by summing a number assigned to said one key and a first predetermined constant.

3. The protocol of claim 2, wherein the first predetermined constant is 128 in decimal.

4. The protocol of claim 2, wherein the second data is formed by performing XOR operation over the parameter and a second ID code different from the first ID code.

5. The protocol of claim 4, wherein the second ID code is AB in Hexadecimal.

6. The protocol of claim 4, wherein the BREAK code comprises a first data and a second data following the first data, the first data is formed by performing XOR operation over the key number and the first ID code, and the second data is formed by performing XOR operation over the key number and the second ID code.

7. The protocol of claim 4, the keyboard further comprising at least one extended key, the communication protocol further comprising an EXTENT code corresponding to said extended key, wherein as said extended key is depressed, the EXTENT code representative of a leading code for said extended key is generated, the EXTENT code includes a first data and a second data following the first data, the first data is formed by performing XOR operation over a second predetermined constant and the first ID code, and the second data is formed by performing XOR operation over the second predetermined constant and the second ID code.

8. The protocol of claim 7, wherein the second predetermined constant is 5E in Hexadecimal.

9. The protocol of claim 4, the communication protocol further comprising an ERROR code corresponding to a ghost combination of depressed keys, wherein the ERROR code includes a first data and a second data following the first data, the first data is formed by performing XOR operation over a third predetermined constant and the first ID code, and the second data is formed by performing XOR operation over the third predetermined constant and the second ID code.

10. The protocol of claim 9, wherein the third predetermined constant is 8E in Hexadecimal.

11. The protocol of claim 4, further comprising an END code generated about 0.1 second after the key is released, wherein the END code includes a first data and a second data following the first data, the first data is formed by performing XOR operation over a fourth predetermined constant and the first ID code, and the second data is formed by performing XOR operation over the fourth predetermined constant and the second ID code.

12. The protocol of claim 11, wherein the fourth predetermined constant is 0E in Hexadecimal.

13. The protocol of claim 4, further comprising a REPEAT code generated when the key is staying depressed for over 0.25 second, the REPEAT code includes a first data and a second data following the first data, the first 20 data is formed by performing XOR operation over a fifth determined constant and the first ID code, the second data is formed by performing XOR operation over the fifth predetermined constant and the second ID code.

14. The protocol of claim 13, wherein the fifth predetermined constant is 00 in Hexadecimal.

15. The protocol of claim 1, wherein the first ID code is 53 in Hexadecimal.

16. The protocol of claim 1, wherein the MAKE code is encoded into a RS232 format before transmitting to the personal computer.

17. The protocol of claim 1, the keyboard further including a pointing device thereon, wherein as the pointing device is moved, a pointing packet is generated, wherein the pointing packet comprises an identification code, a first code indicative of increment in X-direction following the identification code, and a second code indicative of increment in Y-direction following the first code.

18. The protocol of claim 17, the input device further including a remote controller for a personal computer, the remote controller including at least one button thereon, wherein as the button is depressed, a first packet is generated, wherein the first packet comprises a make-code, a button-code assigned to button following the make-code, and a check-code following the button-code.

19. The protocol of claim 18, wherein the check-code is an inverse of the button-code.

* * * * *